(12) United States Patent
Kim

(10) Patent No.: US 9,128,290 B2
(45) Date of Patent: Sep. 8, 2015

(54) APPARATUS AND METHOD FOR COMBINING LANE INFORMATION WITH A FAR-INFRARED NIGHT VISION IMAGE

(75) Inventor: Seok Gyu Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 434 days.

(21) Appl. No.: 13/450,924

(22) Filed: Apr. 19, 2012

(65) Prior Publication Data
US 2013/0135478 A1 May 30, 2013

(30) Foreign Application Priority Data

Nov. 25, 2011 (KR) ........................ 10-2011-0124196

(51) Int. Cl.
H04N 7/18 (2006.01)
H04N 5/33 (2006.01)
G02B 23/12 (2006.01)
B60R 1/00 (2006.01)

(52) U.S. Cl.
CPC . *G02B 23/12* (2013.01); *B60R 1/00* (2013.01); *B60R 2300/106* (2013.01); *B60R 2300/305* (2013.01); *B60R 2300/804* (2013.01); *B60R 2300/8086* (2013.01)

(58) Field of Classification Search
None
See application file for complete search history.

(56) References Cited

U.S. PATENT DOCUMENTS

| 2004/0051634 A1* | 3/2004 | Schofield et al. ............ 340/461 |
| 2009/0018711 A1* | 1/2009 | Ueda et al. ..................... 701/1 |
| 2011/0149076 A1* | 6/2011 | Capello et al. ................ 348/148 |

FOREIGN PATENT DOCUMENTS

| JP | 11272849 A | 10/1999 |
| JP | 2002-362302 A | 12/2002 |
| JP | 2008-530667 A | 8/2008 |
| KR | 10-2001-0081297 | 8/2001 |

* cited by examiner

*Primary Examiner* — Andy Rao
*Assistant Examiner* — Tyler Edwards
(74) *Attorney, Agent, or Firm* — Mintz Levin Cohn Ferris Glovsky and Popeo, P.C.; Peter F. Corless

(57) ABSTRACT

The present invention provides an apparatus and method for combining lane information with a far-infrared image, by combining an image taken by a far-infrared image capturing device with a lane information image, and displaying the combined image such that a driver can visualize the location and position of the road lanes on a night vision image that allows visualization of objects such as, for example, animals, people, vehicles, and the like, in the road at night, or in inclement weather conditions, thereby ensuring safe driving while preventing the driver from veering out of a road lane.

7 Claims, 3 Drawing Sheets

- Before synthesis -

- After synthesis -

APPARATUS AND METHOD FOR COMBINING LANE INFORMATION WITH A FAR-INFRARED NIGHT VISION IMAGE

CROSS-REFERENCE TO RELATED APPLICATION

This application claims under 35 U.S.C. §119(a) the benefit of Korean Patent Application No. 10-2011-0124196, filed Nov. 25, 2011, the entire contents of which are incorporated herein by reference.

BACKGROUND (a) Technical Field

The present invention relates to an apparatus and method that combines a lane information image with a far-infrared image. More particularly, the present invention relates to an apparatus and method that combines a lane information image taken by a lane recognition module with an image taken by a far-infrared night vision module and displays the combined image such that a driver can clearly recognize the lane on the driving road while driving at night or in bad weather conditions.

(b) Background Art

Recently, night vision detection systems for detecting objects in the road at night, such as pedestrians, have been released for some luxury vehicles. The night vision detection system is a hardware component that comprises an infrared image capturing device, an infrared lamp, and a display means for displaying an image. The display means may comprise a liquid crystal display for displaying an image taken by the infrared camera, or a head-up display composed of a reflective film formed on the interior surface of a windshield glass, which is otherwise not seen. However, since the head-up display is very expensive, a TFT-LCD panel is typically mounted on a dashboard instead of the head-up display.

The infrared camera is typically installed in a position where an image of the road in front of the vehicle can be easily taken, for example, around a rearview mirror, and the infrared lamp is typically installed around a fog light.

Such a night vision detection system is a kind of visibility assist device, in which, while driving on a dark road at night, or on a foggy road, the infrared lamp emits infrared rays toward a subject area in front of the vehicle and, at the same time, the infrared camera takes an image of the subject area (which may include, e.g., a pedestrian or vehicle) and outputs the captured image to the display means such that a driver can clearly recognize an object (such as a pedestrian), which is otherwise not seen in front of the vehicle, thereby ensuring driving safety.

Night vision detection systems, i.e., the smart night vision system, is typically divided into two types: a near-infrared type and a far-infrared type. While the near-infrared type provides an image that feels similar to the naked eye using a CMOS or CCD image sensor, the far-infrared type shows the temperature difference in front of the system using a thermal sensor, and thus provides an image that is different from that observed by the naked eye.

A major disadvantage of the far-infrared type of night vision is that when the driver keeps his or her eyes on the image taken by the far-infrared camera, the driver can see an object in front of the vehicle, such as a pedestrian, but cannot clearly identify the lanes in the road. In particular, while driving on a curved road in a state where the lane information provided by the far-infrared type night view system is not clear, the driver may be prone to veer out of the lane and crash the vehicle.

In view of the foregoing, there is a need for a far-infrared night vision system for a vehicle that is able to display night vision information while keeping track of the position of relevant road lanes.

SUMMARY OF THE DISCLOSURE

The present invention provides an apparatus and method for combining lane information and a far-infrared night vision system, which combines a lane information image taken by a lane recognition module while driving on a dark road at night with an image taken by a far-infrared night view module, and displays the combined image such that a driver can correctly recognize the position of a lane on a driving road, as well as on the image, thereby ensuring that the driver does not veer out of the lane.

In one aspect, the present invention provides an apparatus for combining lane information with a far-infrared night vision image, the apparatus comprising: a lane recognition module including a lane detection image capturing device and a first controller for transmitting a lane information image taken by the lane detection image capturing device to a far-infrared night view module; the far-infrared night view module including a far-infrared image capturing device for taking an image while driving at night, and a second controller for combining the lane information image transmitted from the first controller with the image taken by the far-infrared image capturing device; and a display means for displaying the combined image received from the second controller.

In another aspect, the present invention provides a method for combining lane information for a far-infrared night vision system, the method comprising: taking, with a far-infrared image capturing device, an image of an area in front of a vehicle while driving at night and taking, with a lane detection image capturing device, a lane information image; combining the lane information image with the image taken by the far-infrared image capturing device; and displaying the combined image on a display means.

In an exemplary embodiment, the method may further comprise setting the image taken by the far-infrared image capturing device as reference coordinates and correcting the lane information image to match the reference coordinates.

In another exemplary embodiment, the method may further comprise storing the reference coordinates of the image taken by the far-infrared image capturing device and the matching information on lane information coordinates corrected based on the reference coordinates in a first controller of a lane recognition module or in a second controller of a far-infrared night view module.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
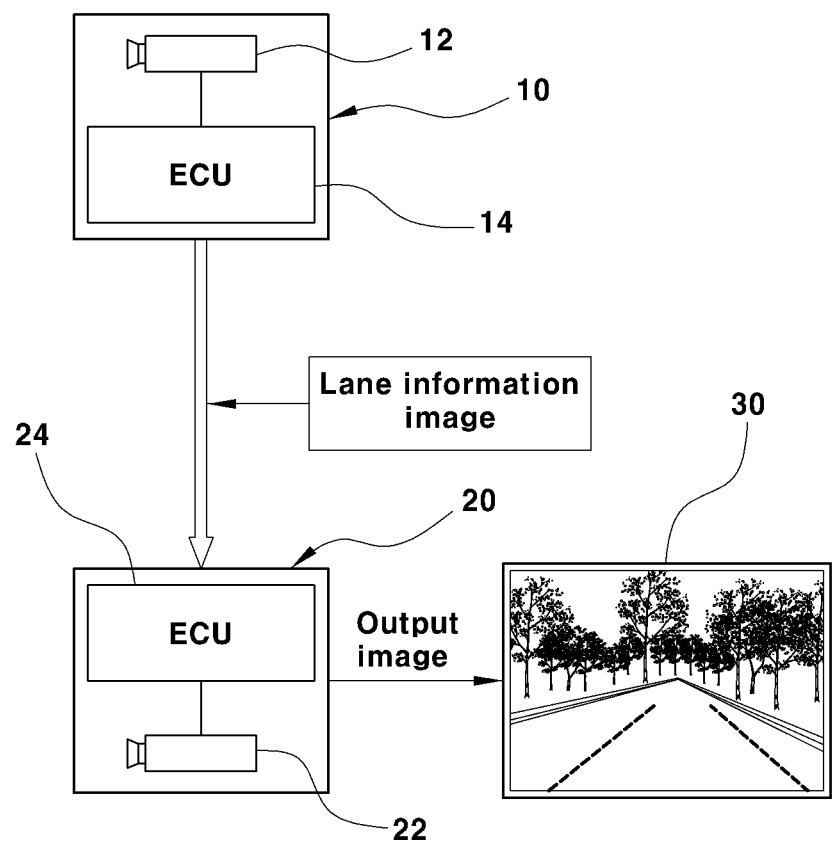
FIG. 1 is a schematic diagram showing an exemplary configuration of an apparatus for synthesizing lane information for a far-infrared night vision image in accordance with an exemplary embodiment of the present invention.

Reference numerals set forth in the Drawings includes reference to the following elements as further discussed below:

| | |
|---|---|
| 10: lane recognition module | 12: lane detection image capturing device |
| 14: first controller | 20: far-infrared night view module |
| 22: far-infrared image capturing device | 24: second controller |
| 30: display means | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The present invention takes into account the fact that road lanes are not clearly displayed on an image taken by a far-infrared night vision module while driving on a road on a dark night. Accordingly, the present invention provides an apparatus and method that combines a lane information image taken by a lane recognition module with an image taken by a far-infrared night vision module and displays the combined image such that a driver can clearly recognize the lane on the driving road as well as on the image, thereby ensuring safe driving within the proper lanes of the road.

As shown in FIG. 1, an exemplary apparatus according to the invention includes a lane recognition module 10, which takes a lane information image from a driving road and outputs the image, and a far-infrared night vision module 20, which takes a far-infrared image and outputs the taken image. The lane recognition module 10 and the far-infrared night vision module 20 are configured to communicate with each other.

The lane recognition module 10 includes a lane detection image capturing device 12 and a first controller 14 configured to transmit a lane information image taken by the lane detection image capturing device 12 to the far-infrared night vision module 20. In an embodiment of the invention, the far-infrared night vision module 20 may be mounted on a vehicle in a forward facing or rearward facing aspect. In a preferred embodiment, the far-infrared night vision module 20 may be mounted in a forward facing aspect, which may include, but is not limited to, the front grill, the front bumper, the head lights, the fog lights, the spoiler, the side mirrors, or the windshield. In a more preferred embodiment, the lane detection image capturing device 12 is installed at an upper edge of the windshield so as to easily take the lane image of the road in front of the vehicle.

The far-infrared night vision module 20 comprises a far-infrared image capturing device 22 for taking an image while driving at night, and a second controller 24 configured to receive the lane information image transmitted from the first controller 14 of the lane recognition module 10 and a far-infrared image from the far-infrared image capturing device 22, and combine or merge the lane information image with the image taken by the far-infrared image capturing device 22. The far-infrared image capturing device 22 may be installed in a position where, for example, an image of the road in front of the vehicle can be easily taken (e.g., around a side mirror, or rearview mirror), and a thermal sensor and a far-infrared lamp, which enable the imaging operation of the far-infrared image capturing device 22, may be installed, for example, around a fog light or head light of a front bumper, or the front bumper, spoiler, or grill of the vehicle.

A display means 30, which displays the combined image obtained by combining the lane information image taken by the lane recognition module 10 with the image taken by the far-infrared night vision module 20, is located in the interior of the vehicle.

A method for combining a lane information image with the image taken by the far-infrared image capturing device 22 by the above system will be described.

In an exemplary embodiment, while driving on a dark road at night, or on a foggy road during the day, the far-infrared lamp emits far-infrared rays toward a subject area in front of the vehicle and, at the same time, the thermal sensor detects the heat of an object, or objects, in front of the car. The far-infrared image capturing device 22 of the far-infrared night vision module 20 takes an image of the road in front of the car, which may include, for example, a pedestrian, a tree, an animal, a vehicle, etc., and the image is transmitted to the second controller 24. At the same time when the far-infrared image capturing device 22 takes the image of the road in front of the car, the lane detection image capturing device 12 takes a lane information image of the road, which is then transmitted to the first controller 14. The lane information image taken by the lane detection image capturing device 12 is then combined with the front image taken by the far-infrared image capturing device 22. For example, the second controller 24 of the far-infrared night vision module 20 combines the lane information image transmitted from the first controller 14 with the image of the road in front of the car taken by the far-infrared image capturing device 22.

Figure 2A:
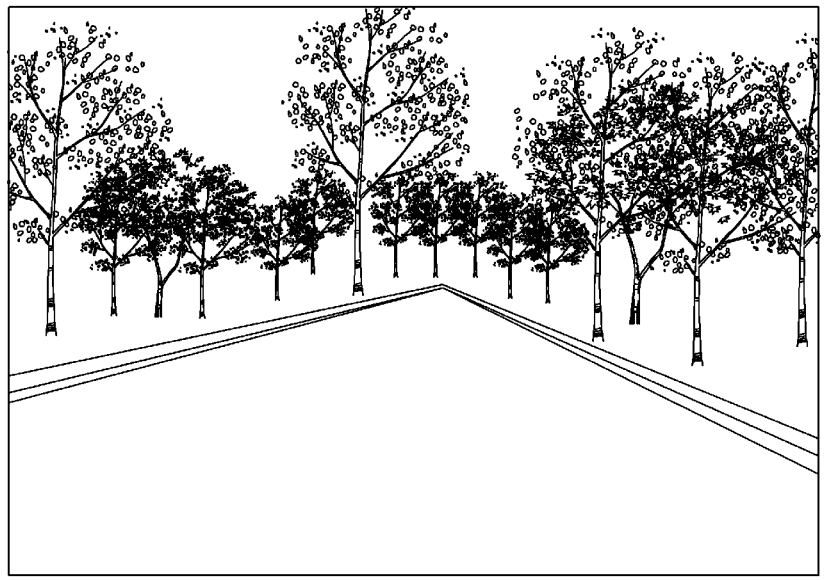
FIG. 2A is a front image before lane information combination by a far-infrared night vision module.
Figure 2B:
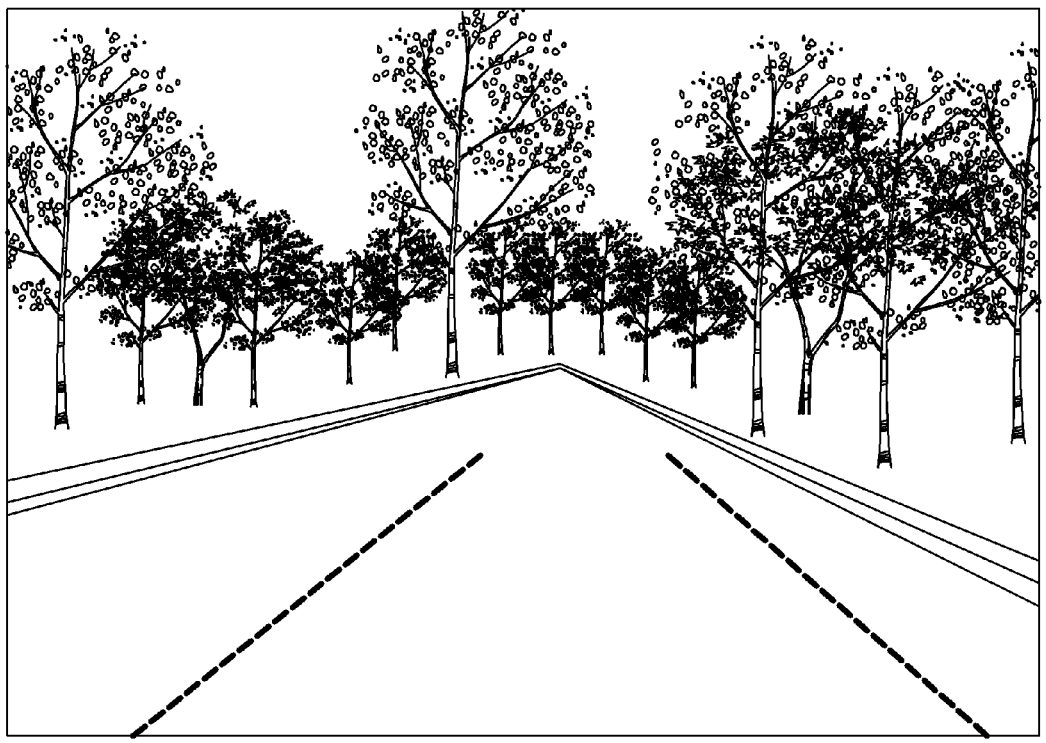
FIG. 2B is a front image after lane information combination by a far-infrared night vision module.

In another exemplary embodiment, the second controller 24 is configured to set the image taken by the far-infrared image capturing device 22 as a reference coordinate image, which may be used to correct the lane information coordinates of the lane information image to match the reference coordinates, and combines the lane information image having the corrected lane information coordinates with the image taken by the far-infrared image capturing device 22. For example, according to an exemplary embodiment, the far-infrared image capturing device may be positioned at a different location on the front of the vehicle than the lane information image capturing device, and the second controller 24 is configured to set the far-infrared image as a reference coordinate image in order to compensate for the perspective differences in the that arise in the lane information image relative to the far-infrared image as a result of the lane information image capturing device 12 being located at a different position than the far-infrared image capturing device 22 (i.e. the two image capturing devices are capturing images of the front of the vehicle from different angles). According to an exemplary embodiment, the second controller 24 is configured to set the far-infrared image as a reference coordinate image and to data process the lane information image and combine it with the far-infrared image so that when the combined image is output from the second controller 24 and displayed on the display means 30, the lanes from the lane information image are displayed in the correct location on the combined image (e.g., compare the combined image of FIG. 2B, with the uncombined image of FIG. 2A). For example, the combined image may be generated by taking into account the difference in the view angles between the lane information image capturing device 12 and the far-infrared image capturing device 22, and calculating the correct location of the lanes on the far-infrared image by spatially transforming the lane position from the lane information image by the image capturing device angle difference. One of skill in the art will recognize that other image transformation methods are also readily available (e.g. image recognition of reference objects/positions that are shared between the lane information image and the far-infrared image, such as, another vehicle).

The reference coordinates of the image taken by the far-infrared image capturing device 22 and the matching information on the lane information coordinates corrected based on the reference coordinates may be stored in the first controller 14 of the lane recognition module 10 or in the second controller 24 of the far-infrared night vision module 20 to be used as data for combining or merging the image taken by the far-infrared image capturing device 22 with the lane information image without correction of the lane information image while driving on the same road later.

As described above, the present invention provides the following advantages. The lane information image taken by the lane recognition module while driving on a dark road at night is combined with the image taken by the far-infrared night vision module and displayed on the display means. This allows the driver to clearly recognize a pedestrian in the road, while seeing the image of the road in front of the car and correctly recognizing the lane on the driving road, thereby accurately identifying the position of the pedestrian and ensuring safe driving without leaving the lane.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or over a Controller Area Network (CAN).

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A night vision system of a vehicle comprising:
   a lane recognition module comprising a lane detection image capturing device and a first controller configured to receive lane detection image data from the lane detection image capturing device and output the lane detection image data to a second controller;
   a far-infrared night vision module comprising a far-infrared image capturing device and the second controller, wherein the second controller is configured to receive the lane detection image data from the first controller, receive a far-infrared image from the far-infrared image capturing device, set the far-infrared image as a reference image with reference coordinates and correct the lane detection image data to match the reference coordinates, and then, combine the corrected lane detection image data from the first controller with the far-infrared image such that lanes from the lane detection image data are matched to the far-infrared image based on the reference coordinates of the far-infrared image, and output the combined image to a display means; and
   a thermal sensor and a far-infrared lamp installed around a fog light or head light to carry out an imaging operation of the far-infrared image capturing device such that the far-infrared lamp emits far-infrared rays toward a subject area in front of the vehicle and, at the same time, the thermal sensor detects heat of an object in front of the vehicle,
   wherein the far-infrared image capturing device takes the far-infrared image that is an image of a road in front of the vehicle, and the image is transmitted to the second controller, and at the same that the far-infrared image capturing device takes the image, the lane detection image capturing device takes a lane information image of the road, which is transmitted to the first controller.

2. The system of claim 1, wherein the far-infrared image capturing device is located on the front bumper, the front spoiler, the front grill, or the windshield edge of the vehicle.

3. The system of claim 1, wherein the far-infrared image capturing device is located on the upper windshield edge of the vehicle.

4. A method for combining a lane information image with a far-infrared image comprising:
   capturing a lane information image with a lane recognition module comprising a lane detection image capturing device and a first controller configured to receive lane detection image data from the lane detection image capturing device and output the lane detection image data to a second controller;
   capturing a far-infrared image with a far-infrared night vision module comprising a far-infrared image capturing device and the second controller, wherein the second controller is configured to receive the lane detection image data from the first controller and a far-infrared image from the far-infrared image capturing device;
   setting the far-infrared image as a reference image with reference coordinates and correcting the lane information image to match the reference coordinates, and then, combining the image data having the corrected lane information image from the first controller with the far-infrared image from the second controller such that lanes from the lane detection image data are matched to the far-infrared image based on the reference coordinates of the far-infrared image; and outputting the combined image to a display means, wherein a thermal sensor and a far-infrared lamp are installed around a fog light or head light to carry out an imaging operation of the far-infrared image capturing device such that the far-infrared lamp emits far-infrared rays toward a subject area in front of the vehicle and, at the same time, the thermal sensor detects heat of an object in front of the vehicle, wherein the far-infrared image capturing device takes the far-infrared image that is an image of a road in front of the vehicle, and the image is transmitted to the second controller, and at the same that the far-infrared image capturing device takes the image, the lane detection image capturing device takes the lane information image of the road, which is transmitted to the first controller.

5. The method of claim 4, further comprising storing the reference coordinates of the far-infrared image and the corrected lane information image in the first controller of the lane recognition module or in the second controller of the far-infrared night vision module.

6. A non-transitory computer readable medium containing program instructions executed by at least one controller, the computer readable medium comprising:

program instructions that request at least one lane information image from a lane recognition module comprising a lane detection image capturing device and a first controller configured to receive lane detection image data from the lane detection image capturing device and output the lane detection image data to a second controller;

program instructions that request at least one far-infrared image from a far-infrared night vision module comprising a far-infrared image capturing device and the second controller, wherein the second controller is configured to receive the lane detection image data from the first controller and a far-infrared image from the far-infrared image capturing device;

program instructions that transmit the at least one image from the lane detection module to the far-infrared night vision module;

program instructions that data process the at least one image from the lane detection module and the at least one image from the far-infrared detection image capturing device, set the far-infrared image as a reference image with reference coordinates and correct the lane information image to match the reference coordinates, and then, combine the image data having the corrected lane information image from the first controller with the far-infrared image from the second controller such that lanes from the lane detection image data are matched to the far-infrared image based on the reference coordinates of the far-infrared image, and create at least one combined image; and program instructions that display the at least one combined image to a driver, wherein a thermal sensor and a far-infrared lamp are installed around a fog light or head light to carry out an imaging operation of the far-infrared image capturing device such that the far-infrared lamp emits far-infrared rays toward a subject area in front of the vehicle and, at the same time, the thermal sensor detects heat of an object in front of the vehicle, wherein the far-infrared image capturing device takes the far-infrared image that is an image of a road in front of the vehicle, and the image is transmitted to the second controller, and at the same that the far-infrared image capturing device takes the image, the lane detection image capturing device takes the lane information image of the road, which is transmitted to the first controller.

7. The computer readable media of claim 6, further comprising:

program instructions that data process the at least one image from the far-infrared night vision module to create a reference coordinate image; and program instructions that compare the at least one image from the lane detection module to the reference coordinate image and data process the at least one image from the lane detection module to correct the lane detection image to match the reference coordinate image.

* * * * *